United States Patent [19]
Pulliam

[11] Patent Number: 5,918,827
[45] Date of Patent: Jul. 6, 1999

[54] LINE SPOOL RETAINER FOR A SPIN CAST FISHING REEL

[75] Inventor: Thomas A. Pulliam, Broken Arrow, Okla.

[73] Assignee: Zebco Division of Brunswick Corporation, Tulsa, Okla.

[21] Appl. No.: 08/788,887

[22] Filed: Jan. 21, 1997

[51] Int. Cl.⁶ .................................................. A01K 89/00
[52] U.S. Cl. .......................................... 242/322; 242/314
[58] Field of Search ..................... 342/311, 314, 342/315, 312, 230–236, 238–240, 322

[56] References Cited

U.S. PATENT DOCUMENTS

| | | | |
|---|---|---|---|
| 2,668,025 | 2/1954 | Hull | 242/238 |
| 2,903,201 | 9/1959 | Sarah | 242/311 X |
| 2,919,077 | 12/1959 | Underwood et al. | 242/235 |
| 3,198,456 | 8/1965 | Wood | 242/239 |
| 3,381,914 | 5/1968 | Taggart | 242/311 X |
| 4,474,341 | 10/1984 | Shackelford et al. | 242/244 |
| 5,372,324 | 12/1994 | Sato | 242/312 |

*Primary Examiner*—Donald P. Walsh
*Assistant Examiner*—Emmanuel M. Marcelo
*Attorney, Agent, or Firm*—Wood, Phillips, VanSanten, Clark & Mortimer

[57] ABSTRACT

A structure for retaining the line spool and elements of a line spool drag mechanism, if employed, upon the hub of a spin cast type fishing reel, wherein the hub has a plurality of axial grooves and radial slots in the surface and the retainer comprises a flange adjacent the line spool, a first cylindrical member extending axially of the flange for disposition over the hub between the hub and the line spool. The first cylindrical member having a plurality of lugs extending radially inwardly thereof into engagement with the axial grooves and radial slots in the hub, whereby the retainer is locked on the hub with the flange adjacent to the outer face of the line spool. A second cylindrical member coaxial with the first extends from the other side of the flange and comprises a cam surface for actuating the line retrieving mechanism and a bearing surface for supporting the line retrieving mechanism in the line retrieving position.

7 Claims, 4 Drawing Sheets

LINE SPOOL RETAINER FOR A SPIN CAST FISHING REEL

FIELD OF THE INVENTION

This invention relates to closed faced spin casting type fishing reels and, more particularly, although not necessarily, to spin casting reels which employ a mechanism which applies a frictional drag force against a line spool.

BACKGROUND OF THE INVENTION

Closed face fishing reels are well known to the art and have been manufactured in large quantities at comparatively low cost for many years in a variety of embodiments. Representative of the earlier reels and the well-developed and rather crowded state of the art are many U.S. patents issued to R. D. Hull, including among many others Nos. 2,541,360; 2,668,025; 2,675,193; 2,964,257; 3,020,666; 3,059,873; 3,088,691; 3,185,504; 3,469,799; 3,481,544; 3,552,674; and 4,474,341.

All closed faced spinning reels of the type contemplated herein include a line spool from which fishing line is paid out and retrieved by an appropriate pickup, which is rotated by a crank mechanism geared thereto; a drag brake mechanism to permit a payout of line when an undue pressure is exerted thereon by a hooked fish; an anti-reverse mechanism to prevent rotation of the crank handle in the payout direction; and a closed face housing completely enveloping the reel mechanism including a thumb button or under-rod lever for preparing the internal mechanism for casting.

The aforementioned basic components have taken a variety of shapes, forms, and structures in the reels of the prior art. However, there are certain improvements therein in the nature of simplification of parts and arrangements which, advantageously lead to a reduction in manufacturing expense and a simplification of assembly and use of the closed face spinning reel. For a more complete understanding of the present invention and a greater appreciation of its intended advantages derived from its specific structural features, reference should be made to the following detailed description, taken in conjunction with the accompanying drawings, which are illustrative of the preferred embodiment of the present invention.

SUMMARY OF THE INVENTION

In closed faced spin cast fishing reels of the type described in the above-mentioned patents, the line spool is generally mounted upon a hub which extends forward from a base plate that comprises a portion of the body of the reel. A rotating drive shaft extends through the hub and is connected to a line retrieving spinner head which may carry a line pickup pin mechanism. The pickup pin is typically spring loaded to the retracted mine payout) position which it takes when the thumb button is pressed in, moving the drive shaft and spinner head forward, and is urged into the extended (line pickup) position by the action of a cam generally located at the outer end of the hub when the hand crank is rotated. The line spool may be mounted for rotation about the hub; if so, it may be restrained from rotation by a line spool drag mechanism such as that described in U.S. Pat. No. 4,474,341, the specification of which is hereby incorporated herein by reference. In reels having such a line spool drag mechanism, it is known to mount a series of non-rotating washers and frictional drag washers upon the hub on opposite sides of the spool and to apply pressure to the assembly axially of the hub. Such a line spool drag assembly may be held in its aligned position upon the hub by a C-clip or similar device which engages the hub near its outer end.

The invention is of a novel structure for retaining the line spool and elements of a line spool drag mechanism, if employed, upon the reel hub. It comprises a reel hub having a plurality of grooves therein, and a spool clip comprising a flange, a first elongate member extending axially of the flange for disposition between the hub and the line spool, and a plurality of lugs extending radially inwardly of the first elongate member for engagement in the grooves of the hub; whereby the flange is retained adjacent to the outer face of the line spool.

In reels employing a line pickup mechanism including a spinner head and drive shaft for the spinner head, the spool clip of the invention may additionally comprise a second member extending axially of the flange in the direction opposition of the first member. The second member comprises a cylinder having a bore extending axially therethrough sized to accept and function as a supporting bearing for the drive shaft. A trip cam for the pin pickup mechanism may extend axially forwardly of the second member to move the pickup pin to the line pickup position in the manner well known to the art.

DETAILED DESCRIPTION OF THE INVENTION

Figure 1:
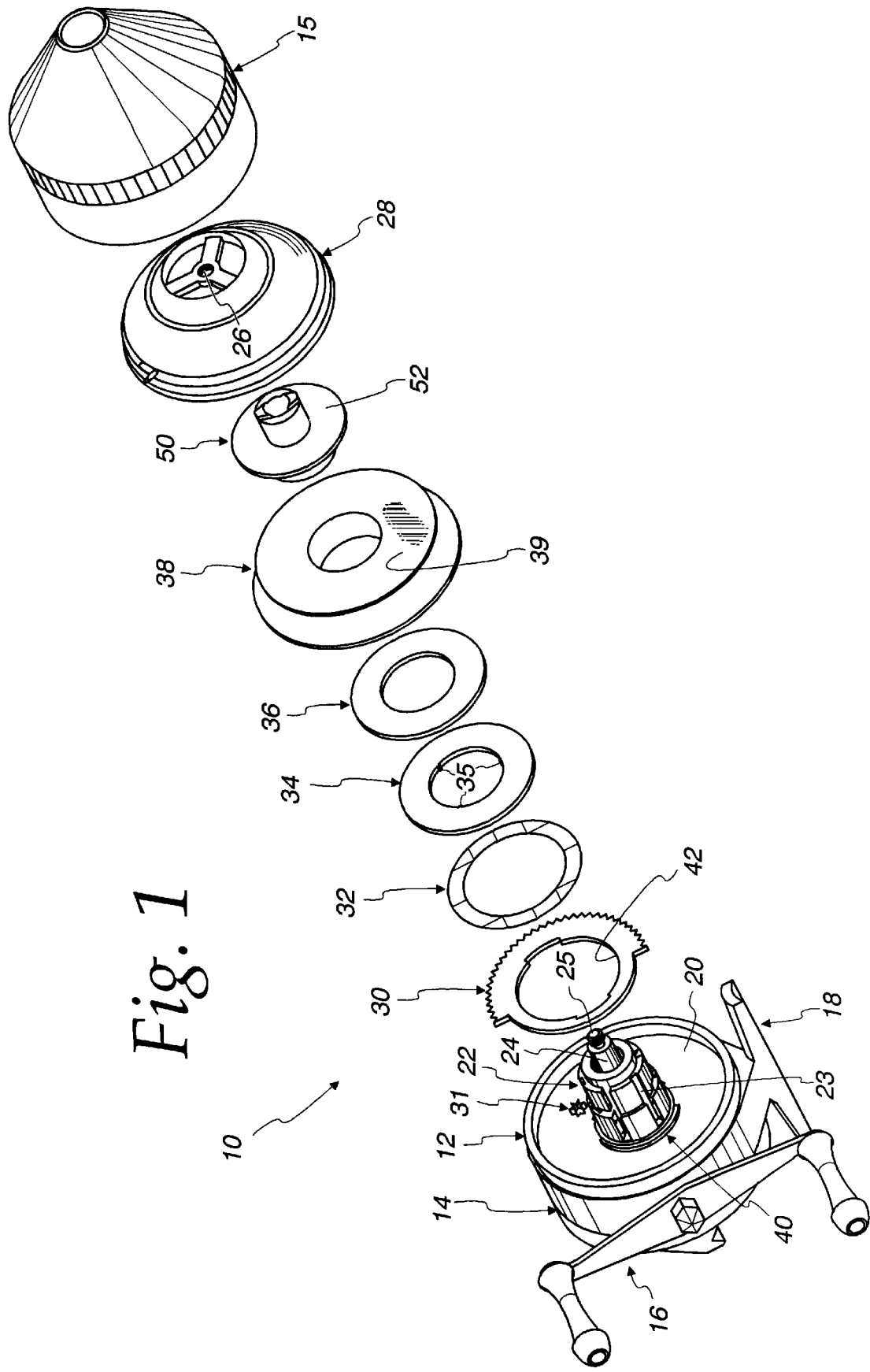
FIG. 1 is an exploded perspective view of a closed faced spin cast type fishing reel employing the improved spool retaining structure of the invention.

FIG. 1 is an exploded view of elements of a spin cast type fishing reel 10 including a body 12, a back cover 14, a crank handle 16, and a foot 18. The body 12 includes a base plate 20 comprised of a centrally located hub 22 which projects outwardly and forwardly of the base plate 20. A drive shaft 24 is journaled within and extends through the hub 22. The outer end 25 of the shaft 24 mates with a threaded bore 26 in the spinner head 28, whereby the spinner head 28 is securely attached to the shaft 24 for rotation thereby. The drive mechanism by which the hand crank 16 is connected to the drive shaft 24 may be any suitable drive such as that described in U.S. Pat. No. 4,474,341, the specification of which is incorporated herein by reference.

Figure 2:
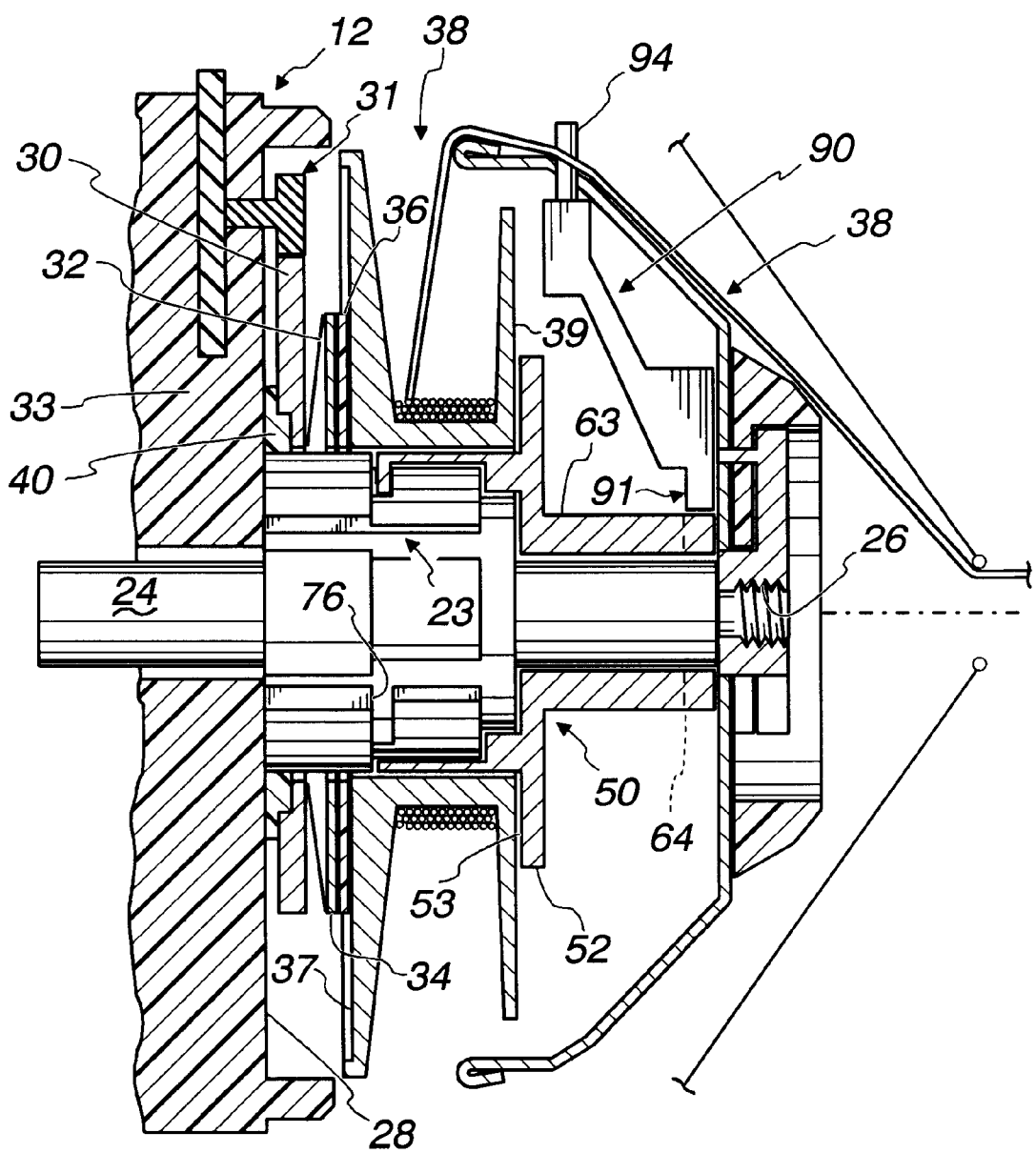
FIG. 2 is a side view partially in section of the elements of FIG. 1 assembled.

The drag mechanism illustrated in FIGS. 1 and 2 includes a geared clutch plate 30, a wavy clutch spring washer 32, a keyed washer 34, and a drag washer 36 positioned between the base plate 20 and the inner side 37 of the line spool 38. During assembly of the reel, all of the elements of the drag mechanism are slipped onto the cylindrical hub 22 of the reel in the order illustrated in FIG. 1. The spool clip 50 of the invention is then slipped over the outer end of the hub 22 and rotated counterclockwise to the locked position to retain the line spool and brake assembly in place upon the hub in the manner described below.

In the drag mechanism illustrated in FIGS. 1 and 2, a thumb operated drive gear 31 rotates the geared clutch plate 30 about the hub 22. Mating cams 40 on the base plate 20 and 42 on the inner face 33 of the clutch plate 30 move the clutch plate 30 axially along the hub 22 toward or away from the spool 38, depending upon the direction of rotation of the clutch plate 30. Movement of the clutch plate 30 outwardly toward the line spool 38 urges the drag spring 32, non-rotating washer 34, and drag washer 36 against inner face 37 of the line spool 38 and the outer face 39 of the line spool 38 against the inner face 53 of the flange 52 of the spool clip 50, thereby applying frictional force resisting rotation of the spool 38. Lugs 35 on the inside of the washer 34 engage axial grooves 23 in the exterior surface of the hub 22 so that the washer 34 does not rotate.

Figure 3:
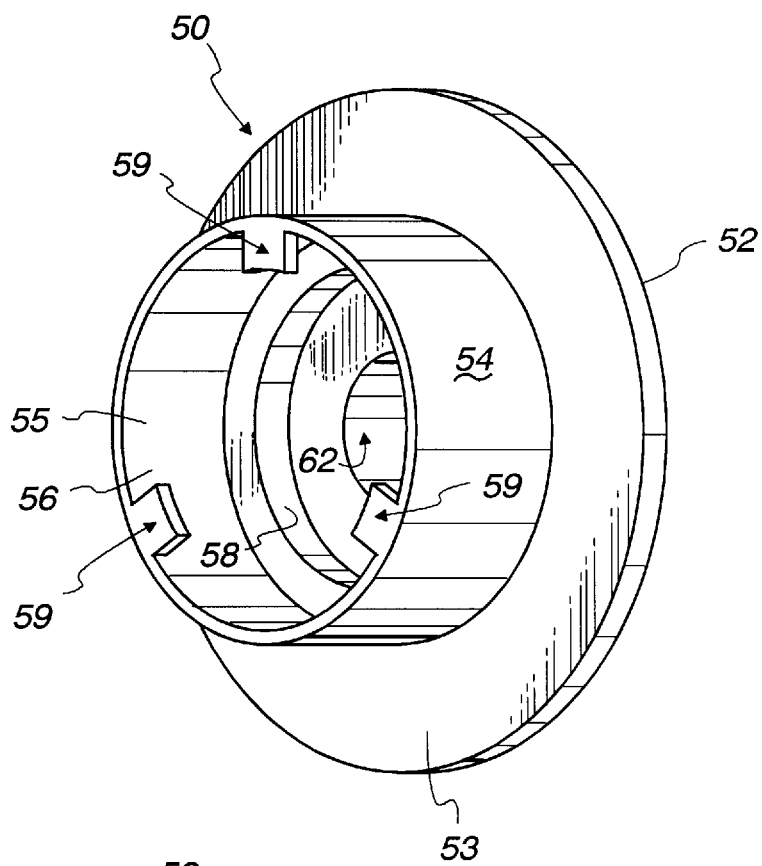
FIG. 3 is a perspective view of the inner side and end of a spool clip of the invention.
Figure 4:
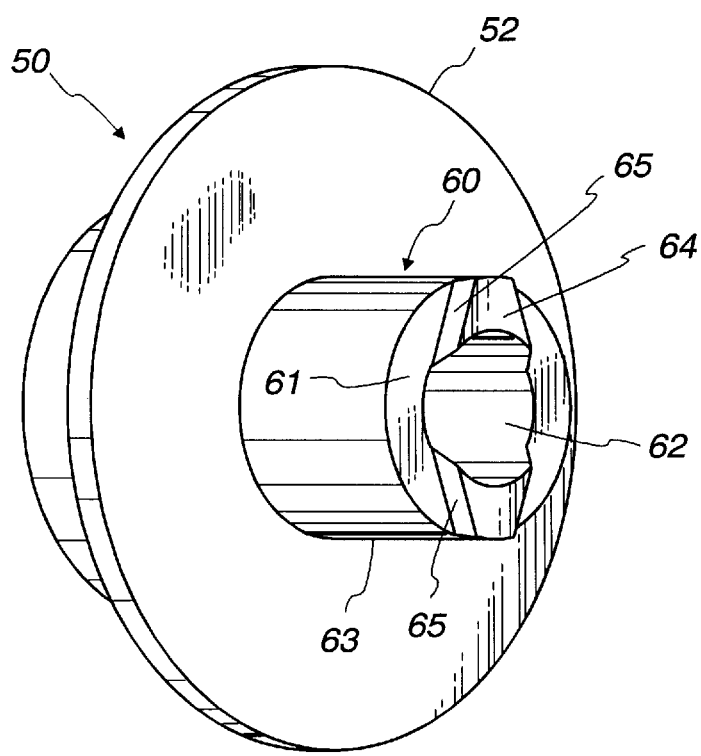
FIG. 4 is a perspective view of the outer side and end of a spool clip of the invention.
Figure 5:
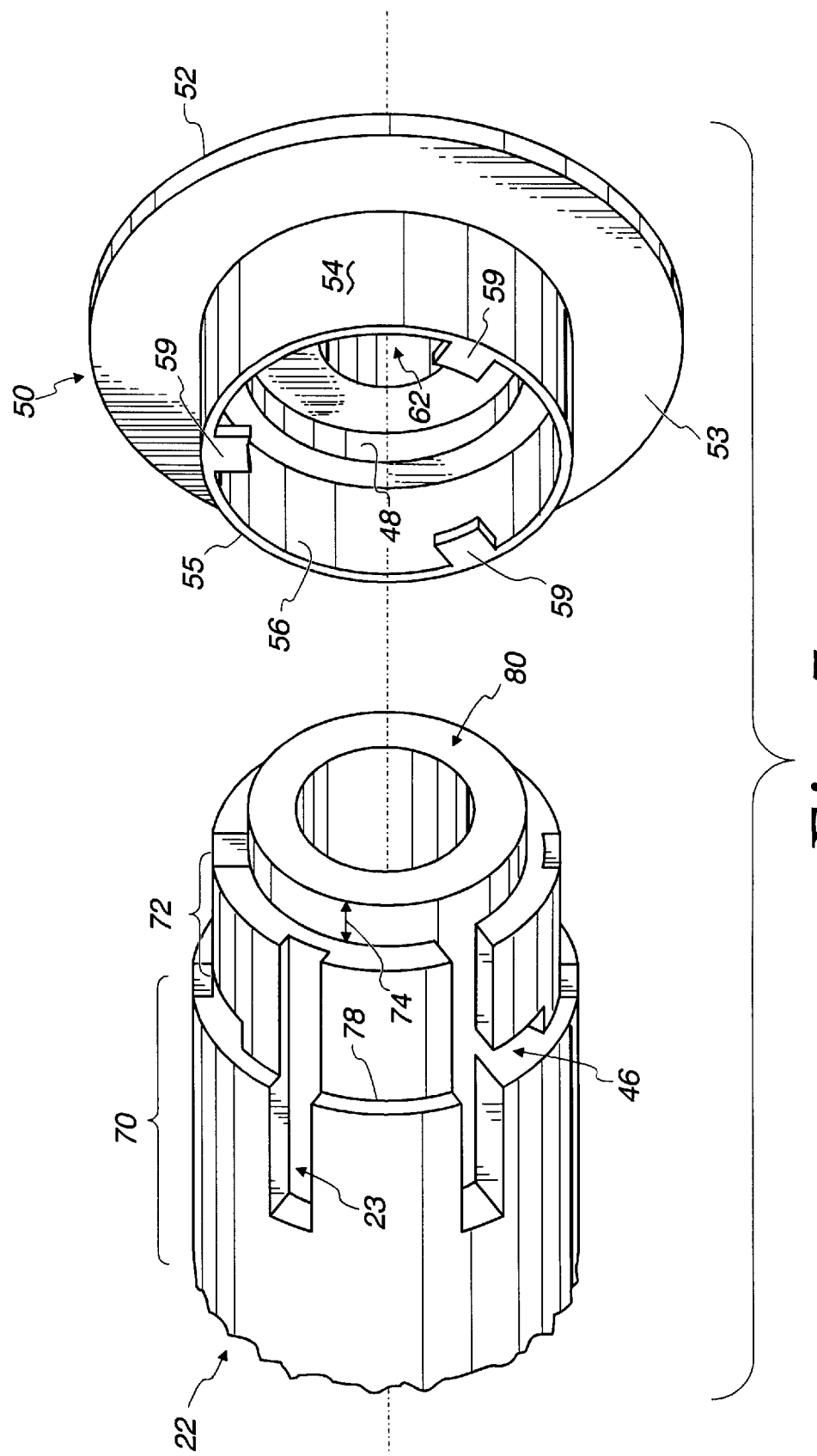
FIG. 5 is a perspective view of the outer side and end of the hub of the reel body broken away from the base plate of the reel with the spool clip of FIG. 3 axially positioned for assembly thereupon.

Referring to FIGS. 3, 4 and 5, a spool clip of the preferred embodiment of the invention is basically comprised of an inner cylindrical section 54 and an outer cylindrical section 60. The cylindrical sections 54 and 60 are joined to and separated by an integral flange 52. A spool clip 50 is configured to fit onto a specifically configured hub 22, best illustrated in FIGS. 2 and 5. The hub 22 stepped, comprising three concentric cylindrical sections of different diameters. The inner section 70, commencing where the hub joins the base plate 20, has a base and largest diameter. An intermediate section 72 has a first reduced diameter being reduced from the base diameter, and an outer end section 74 has a second and further reduced diameter being reduced from the diameter of section 72. The interior of the inner cylindrical section 54 of the spool clip 50 comprises two concentric cylindrical bores 56 and 58. The first bore 56 is sized to closely fit over the intermediate section 72 which comprises the first area of reduced diameter of the hub 22; and, the second bore 58 is sized to closely fit over the outer end section 74 which comprises the second area of reduced diameter of the hub 22. The thickness of the walls of the inner cylindrical section 54 in the areas of the first and second bores 56 and 58, respectively, match the reduction in diameter of the mating sections 72 and 74 of the hub 22; so that, when the clip 50 is mated to the hub 22 as illustrated in FIGS. 2 and 5, the overall outside diameter of the assembly exactly matches the diameter of section 70 or largest diameter of the hub 22. A spool clip 50 is attached to the hub 22 so that the axial outer surface of section 54 functions as a plain bearing surface for the line spool 38, by three lugs 59 projecting radially inwardly of the inner cylindrical section 54 of the spool clip 50. The lugs 59 are located at the axial extremity of the inner cylindrical section 54 at the inner end of the clip 50.

Referring to FIGS. 2 and 5, the hub 22 is provided with a series of axial grooves 23 positioned around the periphery. The depth of the grooves 23 in the intermediate section 72 of the hub 22 approximately equals the inward reach of the lugs 59, but the clearance between the lugs 59 and the bottom of the grooves 23 is snug so that some force is required to assemble the parts and help retain the clip 50 on the hub 22. To facilitate assembly and disassembly, the spool clip 50 may be made of am acetal or other resilient plastic material.

Upon assembly, the spool clip 50 is axially slipped onto the hub 22, the lugs 59 ride in the grooves 23 for the length of the intermediate section 72. At this point, the spool clip 50 is rotated counterclockwise and the lugs 59 move into radial slots 76 cut into the hub 22. The slots 76 intersect the grooves 23 at the inner end 78 of the intermediate section 72 of the hub 22. When so assembled, the flange 52 of the spool clip 50 abuts the outer end 80 of the hub 22 and the line spool and drag brake elements enumerated above are operationally secured upon the hub as illustrated in FIG. 2 in the order illustrated in FIG. 1.

Referring to FIGS. 2 and 4, the flange 52 and outer cylindrical section 60 of the spool clip 50 have an axial bore 62 therethrough configured to accept and function as a bearing for the shaft 24. Cams 64 extending axially outwardly of the end 61 of the outer cylindrical sections 60 each providing a radial axial cam surface which functions to force the inner arm 92 of the pickup pin mechanism 90 radially outwardly, moving the pickup pin 94 to the line pickup position in the manner well known to the art. Also, the outer radial surface 64 of the outer cylindrical section 60 of the clip 50 now functions as a bearing for the arm 92 of the pickup pin mechanism 90.

The central flange section 52 of the spool clip 50 may function as part of a drag brake mechanism of the reel 10. When so employed, the inner face 53 of the flange 52 abuts the outer face 39 of the line spool 38 and, being non-rotating, exerts an anti-rotational frictional force thereon when the clutch plate 30 is moved forward. If desired, a plastic drag washer such as washer 36 may be placed between the outer face 39 of the spool 38 and the flange 52.

The primary advantage of the spool clip 50 of the invention is that it simultaneously: (a) retains the line spool 38 and elements 30–36 of the drag brake mechanism on the hub 22; (b) provides a replaceable bearing for the line spool 38; (c) provides outer end support for the center shaft 24 in the form of a bearing; (d) provides trip cam 64 for the pickup pin mechanism 90; (e) provides a bearing surface 64 for the pickup form 92 of the pickup mechanism 90; and (f) functions as a non-rotating element in the drag brake mechanism of the reel.

It will be appreciated by those knowledgeable in the art that the invention not only speeds assembly of the reel but provides a means for quickly and easily replacing the bearing surfaces involved by merely replacing the spool clip 50, thereby not only effecting a saving in production time but also enabling the end user to maintain peak performance in the field.

It will be understood that the invention may be embodied in other specific forms without departing from the spirit or central characteristics thereof. The present examples and embodiments, therefor, are to be considered as illustrative and not restrictive, and the invention is not to be limited to the details given herein.

I claim:

1. In a spin cast type fishing reel comprising a body, a base plate having a hub extending outwardly thereof, a line retaining spool having inner and outer flange faces mounted for rotation upon the hub, a line pickup spinner head for delivering line to the line retaining spool, and crank means including a center shaft for rotating the line pickup spinner head, an improved means for retaining the line spool on the hub comprising:

a flange disposed adjacent to the outer flange face of the line spool;

a first hollow elongate cylindrical member attached to and extending axially of the flange over a majority of the hub between the hub and the line spool so as to comprise a replaceable bearing surface for the line spool;

a second cylindrical member extending axially of the flange opposite the first cylindrical member having a bore therethrough comprising a bearing for the center shaft;

and wherein, the hub has a plurality of grooves extending axially along the surface of the hub underlying the line spool and a plurality of radial slots in the surface thereof, each slot intersecting at least one of the grooves at a position underlying the line spool, the first cylindrical member having an inner end positioned substantially between an inner flange of the line spool and the hub; and a plurality of lugs extending radially inwardly of an inner end of the first cylindrical member, the lugs configured and positioned to ride within the grooves as the first cylindrical member is axially urged onto the hub and subsequently to fit into the slots upon rotation of the retaining means into the locked position, so that the lugs engage the slots at a position underlying the line spool.

2. The fishing reel of claim 1 wherein the line pickup spinner head includes a retractable line pickup pin and actuating means for extending and retracting the pin, and wherein the second cylindrical member of the spool retaining means comprises an axial cylindrical surface comprising bearing means for radially supporting the pickup pin actuating means in the line pickup position and an outer end portion comprising an axial cam surface extending axially outwardly thereof for urging the actuating means and thereby the line pickup pin into the line pickup position.

3. In a spin cast type fishing reel comprising a body, a base plate having a hub extending forwardly thereof, a line retaining spool having inner and outer flange faces mounted for rotation upon the hub, improved means for retaining the line spool in operative position on the hub comprising:

a unitary spool retaining clip configured to fit over the outer end of the hub, comprised of:

a flange;

a first cylindrical member extending axially over the hub between the line spool and the hub, and means for locking the spool retaining clip onto the hub comprising:

a plurality of lugs extending radially inwardly of the first cylindrical member for engagement with the hub, wherein the hub comprises a stepped cylindrical surface having a first axial section adjacent the base plate having a first diameter, a second and third axial portions each successive portion being reduced in diameter over the previous axial portion and all three portions underlying the spool, said first and second axial portions having a plurality of parallel axial grooves in the surface thereof sized to slidably receive the lugs therein as the spool clip is slid onto the hub, and said second axial portion having a plurality of radial slots in the surface thereof adjacent the first axial portion, each slot communicating with and extending radially from at least one of the grooves, said radial slots being sized and positioned to receive the lugs therein upon rotation of the retaining clip after the clip is slid fully onto the hub, whereby the retaining clip is locked onto the hub, and wherein the flange is positioned on the first cylindrical member so as to abut the outer flange of the line spool when the spool retaining clip is locked onto the hub.

4. The retaining member as in claims 1 or 3 in which the slots extend around the hub through an arc of less than 60°.

5. In a spin cast type fishing reel comprising a body, a base plate, a cylindrical hub extending outwardly of the base plate, a line retaining spool removably mounted on the hub and having an outer side wall, a rotatable line pickup means positionable in a line pickup position to deliver line to the spool, and means for rotating the line pickup means including a rotating drive shaft extending through the base plate and the hub;

an improved structure for retaining the line spool upon the hub comprising:

a spool clip comprising a flange means disposed adjacent to the outer side wall of the line retaining spool for limiting axial movement of the spool on the hub, a first cylindrical member attached to and extending axially of the flange having a first axial bore therein sized to receive a portion of the hub underlying the line spool, the first cylindrical member having a plurality of lugs extending radially inwardly of the first bore and wherein the hub has a plurality of axial grooves in the surface thereof and a plurality of radial slots in the surface thereof, each slot intersecting a single groove, and wherein the lugs are sized and positioned to ride within the grooves as the first cylindrical member is axially urged over the outer end of the hub and subsequently into the slots upon rotation of the spool clip, so that the lugs prevent axial withdrawal of the spool clip from the hub, the cylindrical hub having a pre-selected base diameter and is axially stepped forming a first axial section of reduced diameter, smaller than the base diameter, wherein the slots are in the first axial section of reduced diameter, and wherein the first bore in the first cylindrical member of the spool clip is sized to accept the first axial section of reduced diameter, and wherein the outside diameter of the first cylindrical member of the spool clip is equal to the pre-selected base diameter of the hub.

6. The spool clip of claim 5 further comprising a second cylindrical member extending axially from the flange opposite the first member, said second member having an axial bore therethrough forming a bearing for the shaft, the outer end of the second cylindrical member comprising an axial cam means for urging the line pickup means to the line pickup position, the second cylindrical member comprising an axial bearing surface for supporting the line pickup means in the line pickup position.

7. The fishing reel of claim 5 wherein the cylindrical hub has a second axial section of reduced diameter outwardly of and smaller in diameter than the first axial section of reduced diameter, and wherein the first cylindrical member of a spool clip has a second bore therein coaxial with the first bore and sized to snugly mate with the second axial section of reduced diameter of the hub when the spool clip is assembled to the hub, so as to stabilize the union of the spool clip and the hub.

* * * * *